US010698475B2

(12) United States Patent
Choi et al.

(10) Patent No.: US 10,698,475 B2
(45) Date of Patent: Jun. 30, 2020

(54) VIRTUAL REALITY INTERACTION METHOD, APPARATUS AND SYSTEM

(71) Applicant: HTC Corporation, Taoyuan (TW)

(72) Inventors: Chi-Yin Choi, Beijing (CN); Zhongyang Zheng, Beijing (CN); Shuang Yang, Beijing (CN); Zhongqian Dong, Beijing (CN); Bo Wang, Beijing (CN); Yakun Wang, Beijing (CN); Tao Yang, Beijing (CN); Edward Yjhuei Chang, Beijing (CN); Alvin Graylin, Beijing (CN)

(73) Assignee: HTC Corporation, Taoyuan (TW)

( * ) Notice: Subject to any disclaimer, the term of this patent is extended or adjusted under 35 U.S.C. 154(b) by 304 days.

(21) Appl. No.: 15/794,016

(22) Filed: Oct. 26, 2017

(65) Prior Publication Data

US 2018/0113505 A1 Apr. 26, 2018
US 2019/0302878 A9 Oct. 3, 2019

Related U.S. Application Data

(60) Provisional application No. 62/546,551, filed on Aug. 17, 2017.

(30) Foreign Application Priority Data

Oct. 26, 2016 (CN) .......................... 2016 1 0946978
May 15, 2017 (CN) .......................... 2017 1 0339131

(51) Int. Cl.
*G06F 3/048* (2013.01)
*G06F 3/01* (2006.01)
(Continued)

(52) U.S. Cl.
CPC ............. *G06F 3/011* (2013.01); *G02B 27/017* (2013.01); *G06F 3/017* (2013.01); *G06F 3/0304* (2013.01);
(Continued)

(58) Field of Classification Search
CPC ........ G06F 3/011; G06F 3/017; G06F 3/0304; G02B 27/017; G06K 19/06037; G06K 7/1417; G06T 19/006
(Continued)

(56) References Cited

U.S. PATENT DOCUMENTS 6,637,883 B1 * 10/2003 Tengshe ................. A61B 3/113
351/210
8,878,750 B1 * 11/2014 Park ..................... G02B 27/017
345/8
(Continued)

FOREIGN PATENT DOCUMENTS

WO 2013/028908 A1 2/2013
WO 2016/130860 A2 8/2016

OTHER PUBLICATIONS

Search Report dated Jan. 4, 2018 for EP application No. 17198547.6, pp. 1-9.
(Continued)

*Primary Examiner* — David Phantana-angkool
(74) *Attorney, Agent, or Firm* — Winston Hsu

(57) ABSTRACT

A virtual reality interaction method comprises: continuously acquiring image information in front of a user; recognizing a preset interactive object by recognizing a preset identifier in the image information, a surface of the preset interactive object having one or more of the preset identifiers; recognizing a hand action of the user according to the image information; and simulating an interactive action of the user on the preset interactive object in a virtual reality environment according to the hand action and a position of the preset interactive object. The virtual reality interaction method provided by the present disclosure can accurately
(Continued)

simulate an interactive action of the user on a real object in a virtual reality environment, thereby improving user experience of virtual reality.

20 Claims, 24 Drawing Sheets

(51) Int. Cl.
    *G06K 19/06*      (2006.01)
    *G02B 27/01*      (2006.01)
    *G06K 7/14*      (2006.01)
    *G06T 19/00*      (2011.01)
    *G06F 3/03*      (2006.01)

(52) U.S. Cl.
    CPC ..... *G06K 7/1417* (2013.01); *G06K 19/06037* (2013.01); *G06T 19/006* (2013.01); *G02B 2027/0138* (2013.01)

(58) Field of Classification Search
    USPC .......................................................... 715/848
    See application file for complete search history.

(56) References Cited

U.S. PATENT DOCUMENTS

| | | | |
|---|---|---|---|
| 9,335,547 B2* | 5/2016 | Takano | G06F 3/005 |
| 9,508,195 B2* | 11/2016 | Heuvel | G06T 7/70 |
| 10,067,636 B2 | 9/2018 | Palmaro | |
| 10,217,288 B2 | 2/2019 | Fedosov | |
| 10,353,478 B2 | 7/2019 | Xu | |
| 10,366,276 B2* | 7/2019 | Levinshtein | G06T 7/74 |
| 10,429,923 B1 | 10/2019 | Johnston | |
| 10,488,942 B2 | 11/2019 | Soto | |
| 10,551,909 B2 | 2/2020 | Iee | |
| 10,558,048 B2 | 2/2020 | Fukuda | |
| 2014/0344762 A1 | 11/2014 | Grasset | |
| 2016/0239080 A1 | 8/2016 | Marcolina | |
| 2018/0113505 A1* | 4/2018 | Choi | G06F 3/011 |
| 2019/0266405 A1* | 8/2019 | Chang | G06F 9/541 |

OTHER PUBLICATIONS

Office action dated Feb. 18, 2020 for the U.S. Appl. No. 16/405,975, filed May 7, 2019, p. 1-14.

* cited by examiner

VIRTUAL REALITY INTERACTION METHOD, APPARATUS AND SYSTEM

CROSS REFERENCE TO RELATED APPLICATION

This application is based on and claims priority to Chinese Patent Applications No. 201610946978.6 filed on Oct. 26, 2016 and No. 201710339131.6 filed on May 15, 2017, the entire contents of which are incorporated herein by reference.

BACKGROUND OF THE INVENTION

1. Field of the Invention

The present disclosure relates to the field of virtual reality technologies, and more particularly, to a virtual reality interaction method, apparatus and system for accurately simulating an interactive action between a user and a real object.

2. Description of the Prior Art

With the development of technologies, virtual reality technologies are widely used in life.

In the related art, when a user expects to get a lifelike interactive experience on a real object in a virtual environment, in most cases the user needs to wear a positioner on a hand or need other special electronic instruments or manipulators. When the user needs to interact with the real object in a virtual reality environment, for example, reading a virtual book, the related art cannot provide a convenient operation mode for the user to read the virtual book in a virtual world.

It is to be noted that the above information disclosed in this Background section is only for enhancement of understanding of the background of the present disclosure and therefore it may contain information that does not form the prior art that is already known to a person of ordinary skill in the art.

SUMMARY OF THE INVENTION

As described above, when the user reads the virtual book, in the related art, it is impossible to distinguish an operation relationship by combining a position between a hand action of the user and a virtual object to achieve convenient operation, for example, page flipping.

Therefore, an objective of the present disclosure is to provide a virtual reality interaction method, apparatus and system for accurately simulating an interactive action between a user and a real object to overcome, at least to a certain extent, one or more problems caused by limitation and defects of related technologies.

According to a first aspect of embodiments of the present disclosure, there is provided a virtual reality interaction method, which includes: continuously acquiring image information in front of a user; recognizing a preset interactive object by recognizing a preset identifier in the image information, a surface of the preset interactive object having one or more of the preset identifiers; recognizing a hand action of the user according to the image information; and simulating an interactive action of the user on the preset interactive object in a virtual reality environment according to the hand action and a position of the preset interactive object.

According to a second aspect of the embodiments of the present disclosure, there is provided a virtual reality interaction apparatus, including:

an image capturing module, configured to continuously acquire image information in front of a user;

an identifier recognizing module, configured to recognize a preset interactive object by recognizing a preset identifier in the image information, a surface of the preset interactive object having one or more of the preset identifiers;

a gesture recognizing module, configured to recognize a hand action of the user according to the image information; and an image output module, configured to simulate an interactive action of the user on the preset interactive object in a virtual reality environment according to the hand action and a position of the preset interactive object.

According to a third aspect of the embodiments of the present disclosure, there is provided a virtual reality interaction system, including: a virtual reality display apparatus, configured to display a virtual reality image for a user; a preset interactive object, configured to assist in recognizing an interactive action of the user; and the virtual reality interaction apparatus as described above.

According to a fourth aspect of the embodiments of the present disclosure, there is provided an electronic device, including: one or more processors; and a storage apparatus, configured to store one or more programs. When the one or more programs are executed by the one or more processors, the one or more processors are caused to implement the above virtual reality interaction method.

According to a fifth aspect of the embodiments of the present disclosure, there is provided a computer readable storage medium, which stores a computer program. When the computer program is executed by the processor, the virtual reality interaction method is implemented.

According to a sixth aspect of the embodiments of the present disclosure, there is provided a virtual reality interaction method, which includes: acquiring image information of a preset interactive object, a surface of the preset interactive object having a preset identifier; acquiring at least one parameter of the preset interactive object by recognizing the image information corresponding to the preset identifier; and executing a preset interactive operation according to the at least one parameter.

According to a seventh aspect of the embodiments of the present disclosure, there is provided a virtual reality interaction apparatus, including: an image capturing module, configured to acquire image information of a preset interactive object, a surface of the preset interactive object having a preset identifier; a parameter acquiring module, configured to acquire at least one parameter of the preset interactive object by recognizing the image information corresponding to the preset identifier; and an interaction execution module, configured to execute a preset interactive operation according to the at least one parameter.

According to an eighth aspect of the embodiments of the present disclosure, there is provided an electronic device, including: one or more processors; and a storage apparatus, configured to store one or more programs. When the one or more programs are executed by the one or more processors, the one or more processors are caused to implement the above virtual reality interaction method.

According to a ninth aspect of the embodiments of the present disclosure, there is provided a computer readable storage medium, which stores a computer program. When the computer program is executed by the processor, the above virtual reality interaction method is implemented.

According to the virtual reality interaction method of the present disclosure, a position of a preset interactive object is determined and a hand action of a user is determined by recognizing a preset identifier on the preset interactive object, and the preset interactive object and a relative position relationship between the hand of the user and the preset interactive object are accurately positioned. In this way, an interactive action of the user on a real object is accurately simulated in a virtual reality environment, and user experience of virtual reality is improved.

It is to be understood that both the foregoing general description and the following detailed description are exemplary and explanatory only and are not restrictive of the present disclosure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
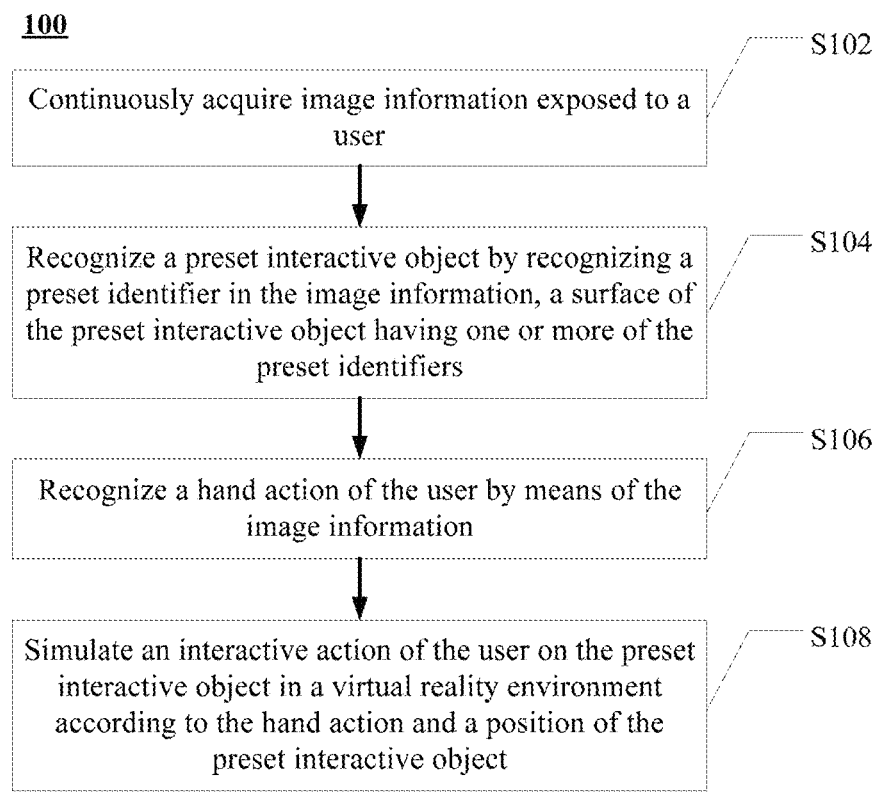
FIG. 1 schematically illustrates a flowchart of a virtual reality interaction method according to an exemplary embodiment of the present disclosure.

Now, exemplary embodiments will be described more comprehensively with reference to the drawings. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

A detailed description of the exemplary embodiments of the present disclosure will be made in the following with reference to the accompanying drawings.

FIG. 1 is a flowchart of a virtual reality interaction method according to the present disclosure. Referring to FIG. 1, the virtual reality interaction method 100 may include following steps:

Step S102: image information in front of a user is continuously acquired;

Step S104: a preset interactive object is recognized by recognizing a preset identifier in the image information, a surface of the preset interactive object having one or more of the preset identifiers;

Step S106: a hand action of the user is recognized according to the image information; and Step S108: an interactive action of the user on the preset interactive object is simulated in a virtual reality environment according to the hand action and a position of the preset interactive object.

A highly immersive mixed reality experience may be constructed according to a position and an orientation of the preset interactive object calculated in the above steps, a virtual content associated with the preset identifier, a gesture and a position of the user, and an interactive result of the gesture in the system.

According to the virtual reality interaction method 100 of the present disclosure, a position of a preset interactive object is determined by recognizing a preset identifier on the preset interactive object and a hand action of a user is determined, and the preset interactive object and a relative position relationship between the hand of the user and the preset interactive object are accurately positioned. In this way, an interactive action of the user on a real object is accurately simulated in a virtual reality environment, and user experience of virtual reality is improved.

The virtual reality interaction method is described in detail below with reference to specific embodiments.

Figure 2:
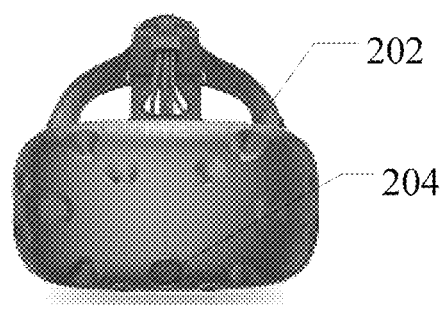
FIG. 2 schematically illustrates a schematic diagram of a virtual reality helmet according to an exemplary embodiment of the present disclosure.

FIG. 2 schematically illustrates a schematic diagram of a virtual reality (VR) helmet according to an exemplary embodiment of the present disclosure. The virtual reality helmet may be, for example, a head-mounted display (HMD). The helmet 200 may include a virtual reality display apparatus 202 and an image capturing apparatus (for example camera) 204.

The above method 100 may be implemented by wearing the virtual reality HMD. The virtual reality HMD of the present disclosure includes one or more image capturing apparatuses, which may be, for example, cameras. The camera may be mounted on the HMD in an internal or external form to capture an environment in front of the HMD so as to continuously acquire image information in front of a user.

The HMD generally is provided with two display screens, respectively arranged in front of eyes, used to display image output results of a virtual reality system. In this system, one processor or other related modules may also be provided to perform, in real time, calculation of each module and display rendering results on the display screens of the HMD. The processor and the other related modules may be built in the HMD, or may be an external apparatus connected to the HMD, either wired or wirelessly, to transmit data.

In an ordinary virtual reality system, after the user wears the HMD, a line of sight of the user may almost be shielded wholly to isolate an external light source. In addition, in the virtual reality system of the HMD with a camera according to the present disclosure, the camera can capture an external environment in front of the user. The camera mentioned in this embodiment may be an RGB channel-based camera, an RGB-D camera, a binocular camera or other cameras common in VR and AR systems.

To provide the user with an experience with mixed reality, objects in front of the HMD or available for interaction should be displayed on the display screen of the HMD in a virtual object manner. According to one method, by performing computer vision algorithm calculation on an image captured by the camera of the HMD, the position, the orientation and the posture of the preset interactive object are tracked. According to another method, a sensor is attached to the preset interactive object. Under the premise of independent of the HMD and an additional sensor of the preset interactive object, the virtual reality interaction method 100 may provide a mixed reality experience via the first method.

Figure 3:
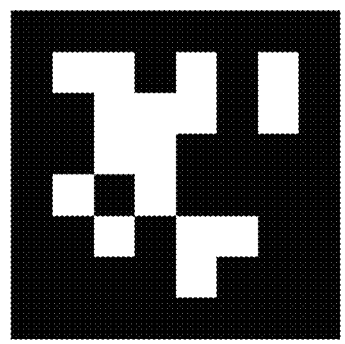
FIG. 3 schematically illustrates a schematic diagram of a preset identifier according to an exemplary embodiment of the present disclosure.

FIG. 3 schematically illustrates a schematic diagram of a preset identifier according to an exemplary embodiment of the present disclosure. Referring to FIG. 3, the preset identifier may be a two-dimensional identifier including a two-dimensional code, a barcode or other two-dimensional patterns, or may be other identifiers that can be recognized by the virtual reality image capturing apparatus and analyzed by the processor afterward. Each preset identifier has an independent identity (ID) to be differentiated from other preset identifiers.

To improve the robustness of the system in tracking the position, the orientation and different postures of the preset interactive object, the preset identifier may be printed on the surface of the preset interactive object. Combination of the preset identifier with the preset interactive object may include printing or adhering an image (for example, April Tag) onto the preset interactive object, or adhering the image to the surface of the preset interactive object in any way.

Figure 4:
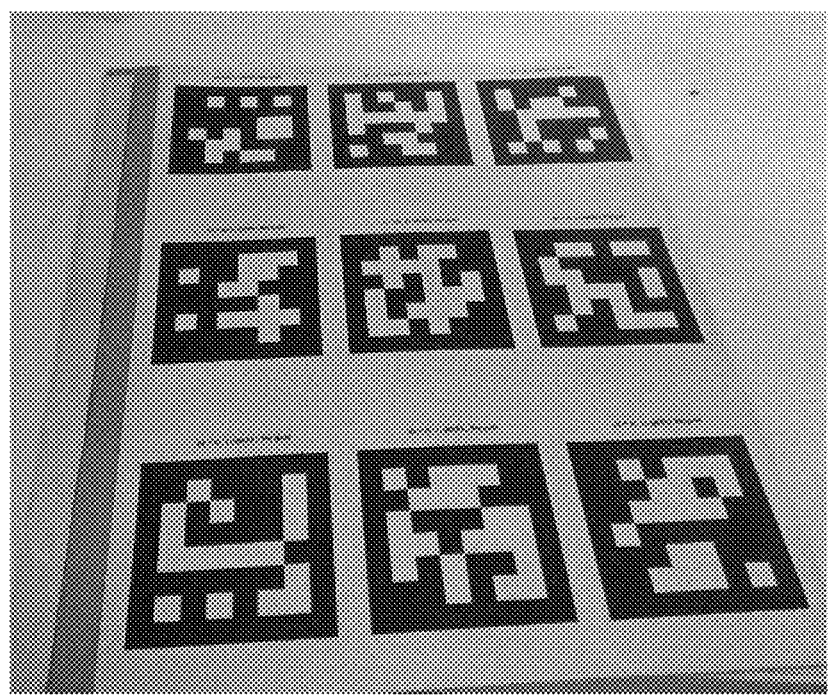
FIG. 4 schematically illustrates a schematic diagram of a single-page booklet according to an exemplary embodiment of the present disclosure.
Figure 5:
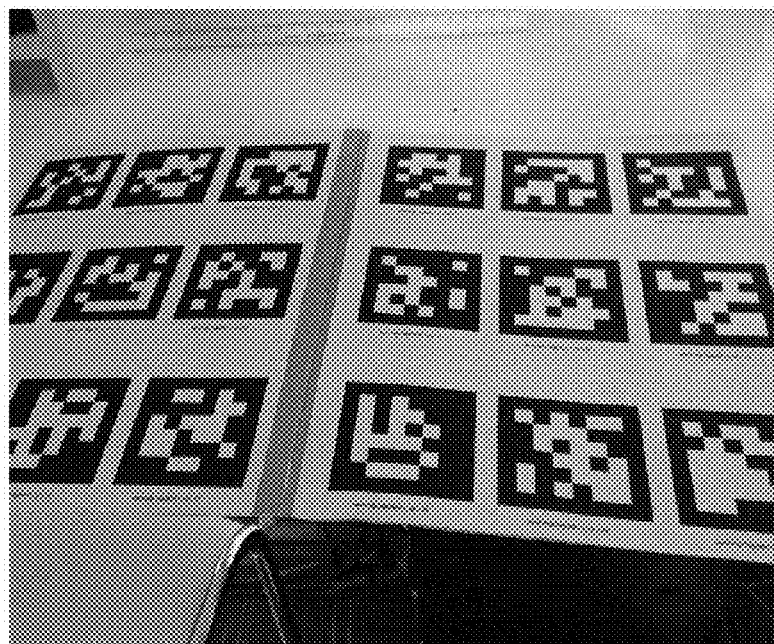
FIG. 5 schematically illustrates a schematic diagram of a multipage booklet according to an exemplary embodiment of the present disclosure.

The preset interactive object may be, for example, a booklet or book, or an object, similar in shape to a booklet or book, made from a hard or soft material, which may have one or more pages and also may be made into a foldable form. The booklet may serve as a target tracking object, and display data according to different designs and requirements. Based on a fact that the preset identifier may be shielded by other objects (for example, a hand), and in order to improve the accuracy of tracking the position of the object, a plurality of preset identifiers may be printed on or adhered to each page of the booklet. In an embodiment, the booklet may have a single page and is printed with one or more preset identifiers. In another embodiment, the booklet may be a flippable page with a front side and a back side, and both sides are printed with one or more preset identifiers. In another embodiment, the booklet may have two or more foldable pages, each of which is printed with one or more preset identifiers. For example, FIG. 4 schematically illustrates a schematic diagram of a single-page booklet according to an exemplary embodiment of the present disclosure; and FIG. 5 schematically illustrates a schematic diagram of a multipage booklet according to an exemplary embodiment of the present disclosure.

Positions and orientations of one or more preset identifiers may be determined according to images of the one or more preset identifiers in acquired image information, and the position and the orientation of the booklet may be calculated according to relative positions of the preset identifiers with respect to the booklet. Data of the relative position may be predefined, or may be corresponding information searched from a database according to a unique code of the preset identifier.

A virtual booklet may be displayed in the HMD according to the data on the basis of the position and the orientation of the obtained booklet. In order to further improve the immersion, in addition to the position and the orientation, a real size of the booklet and a virtual size of the booklet displayed in the helmet may be corresponding according to a ratio of 1 to 1, or may be corresponding according to a fixed ratio or other nonlinear ratios allowing the user to feel a high immersion.

If the booklet has multiple pages, in an embodiment, by tracking the preset identifiers, when the user flips the booklet to a next page, the virtual booklet may correspondingly display a content of the page. In this scenario, the number of pages of the virtual booklet needs to be consistent with that of pages of a physical booklet. Nevertheless, in another embodiment, the requirement for the number of pages of the physical booklet may be lowered via gesture recognition. When the user executes a page flipping gesture, page flipping of the virtual booklet may be triggered, and a process and a result of the page flipping are displayed. Therefore, this method may support the user to simulate to browse a virtual booklet with infinite pages in the virtual environment by operating the entity booklet with at least one page.

In addition to displaying characters and picture contents in the entity booklet generally, a multimedia content (such as animation, video, music and sound), a 3D content and a 360 virtual reality content may be displayed in the virtual booklet, for example, displayed in the virtual booklet or displayed in a position, corresponding to the virtual booklet, in virtual space. The content is displayed or the interaction is performed by means of a gesture or an interactive operation of other control devices on the booklet or other objects in the system.

Figure 6:
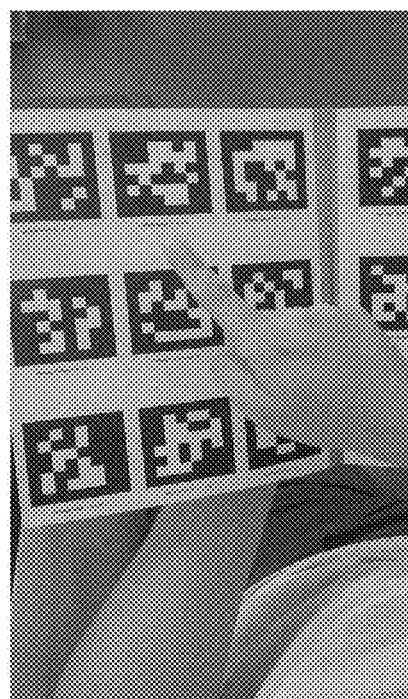
FIG. 6 schematically illustrates a schematic diagram in which a hand shields an upper identifier of a booklet according to an exemplary embodiment of the present disclosure.

FIG. 6 schematically illustrates a schematic diagram in which a hand shields an upper identifier of a booklet according to an exemplary embodiment of the present disclosure. A unique code (ID) of the preset identifier on the booklet may be read and the position and the orientation of the booklet relative to the camera may be calculated out by means of a photo acquired by the camera.

By using a computer vision tracking algorithm in this module, the system can track a target object appearing in the camera, for example, the booklet or other similar objects. The tracking algorithm extracts key features of the object, for example, a color, an edge, a texture and so on. This is a topic which has been studied in depth. To provide a high-quality mixed reality system, the tracking algorithm of this module needs to reach a high accuracy (for example a millimeter class), has high robustness in different types of objects (such as shape, color and surface) and different peripheral environments (such as lamplight and background), and calculate a result highly in real time (for example, 60 frames/s).

To avoid the various problems as described above, a known pattern is adhered to or printed on the preset interactive object. According to this known pattern, the physical size of the pattern and parameters of the camera (such as a focal length and a lens type), the position and the orientation of the pattern relative to the camera may be calculated out using geometric graphics, and then the position and the orientation of the object relative to the camera may be calculated out through the position and the orientation of the pattern relative to the preset interactive object.

An example of the pattern is April Tag. By utilizing high computing performance of a modern high-speed central processing unit and a general purpose graphics processing unit, pattern decoding and position calculation thereof may be performed in real time (for example, less than 1/60 s). To avoid user dizziness and provide a high refresh rate (such as 60 Hz), this real-time calculation is necessary in the VR and AR (augmented reality) systems.

In addition, there are other means for improving the tracking quality, for example, a method of prediction, which is used for predicting a result of next tracking and increasing a response speed of the system. Or a smoothing and buffering method may be permissible, which is used for reducing an error caused by rapid movement of the object or poor quality of other photographed pictures due to a tracking error through an algorithm for filtering or smoothing noises using mobile data of a previous segment of the object.

A photo acquired by the camera may be used for recognizing a posture and a position of a hand.

Use of a hand is the most natural method for interaction between the user and the external environment. This system includes a hand position tracking and gesture recognizing module.

An RGB camera may be used for capturing a 2D scenario. Because of a suitable price, the RGB camera is the most widely used in the market. The hand position and the tracking and recognition generally need to be segmented and positioned via background. However, it is difficult to ensure to acquire highly reliable hand position and gesture only according to information in the 2D photo. This is because of: 1) the hand being a non-rigid object; 2) skin colors of different races and skin textures of different crowds; 3) lamplight conditions in different environments; and 4) interferences of background objects in different environments.

Nevertheless, results in this aspect may be improved by utilizing other information in this system. When the user interacts with a booklet in this system, one or a series of preset identifiers in the booklet may be obstructed by a moving hand because the hand of the user performs operation above the booklet, so that an image of the preset identifier is not a complete image. When a plurality of hand candidate regions are detected in the system, the hand candidate regions may be filtered out by determining whether the image of the obstructed preset identifier overlaps with different candidate hand positions. This is more possible to provide a highly reliable tracking result than there being the hand position only and being without preset identifier blocking information of the booklet.

Meanwhile, in an embodiment, this system includes a model that can recognize the skin color. Nevertheless, because of different skin color characteristics of various races and different lamplight environments, the user may select to establish a skin color model of his/her own. The flow is described below.

The user is guided to wear the helmet (HMD) and put the booklet in front of the helmet camera (for example, putting the booklet on a desk in front or grasping the booklet by the hand). Meanwhile, the system calculates the position of the booklet via the code tracking module.

The helmet displays a region above the virtual booklet, and the user is guided to cover the region by the hand and stay for a short period of time (for example 5s).

The system may determine whether the hand has stayed on this region through color changes before and after the coverage or by determining whether the preset identifier on the region is covered, etc.

After the system examines that the hand covers the region, the color range of the hand is acquired via color segmentation. By utilizing the data, an accurate hand segmentation model according to colors may be established. This model is established according to the skin color characteristics of the user and the environment where the user is. Therefore, the accuracy of subsequent hand segmentation can be improved.

Figure 7:
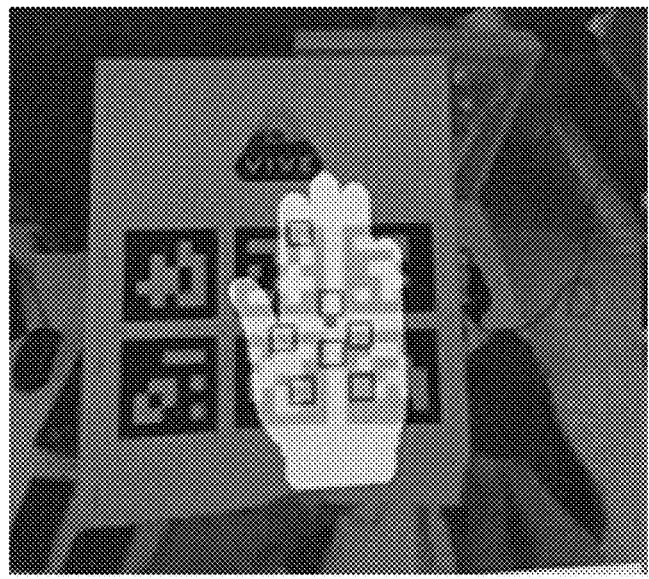
FIGS. 7-11 schematically illustrate schematic diagrams of hand calibration procedures according to exemplary embodiments of the present disclosure.

FIGS. 7-11 schematically illustrate schematic diagrams of hand calibration procedures according to exemplary embodiments of the present disclosure. Referring to FIGS. 7-11:

In FIG. 7, the user is guided to put the hand on the booklet.

Figure 8:
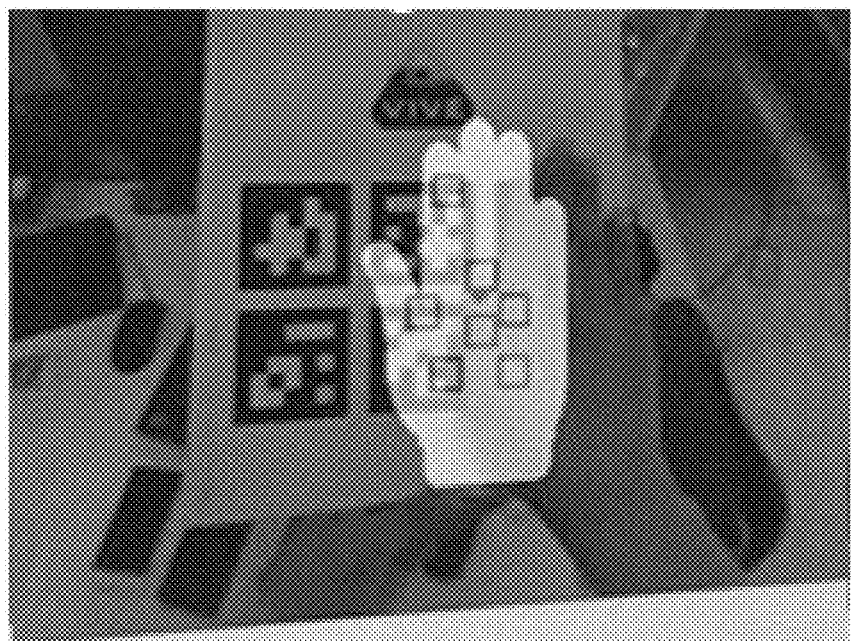

In FIG. 8, when the user moves the hand on the booklet, the color of an indication mark changes from red to green.

Figure 9:
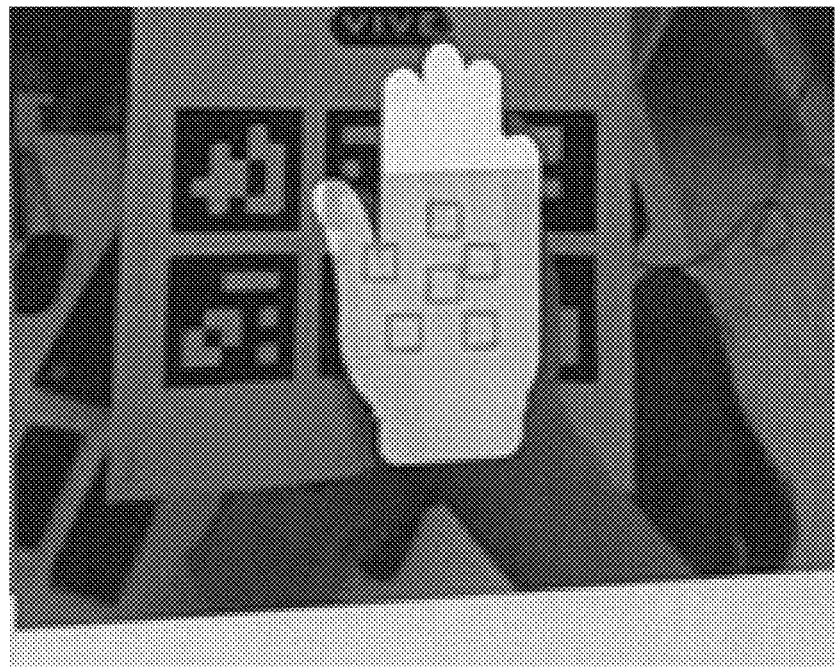

In FIG. 9, the user is required to rest the hand on the booklet for a while, and then the calculation process is displayed on the screen.

Figure 10:
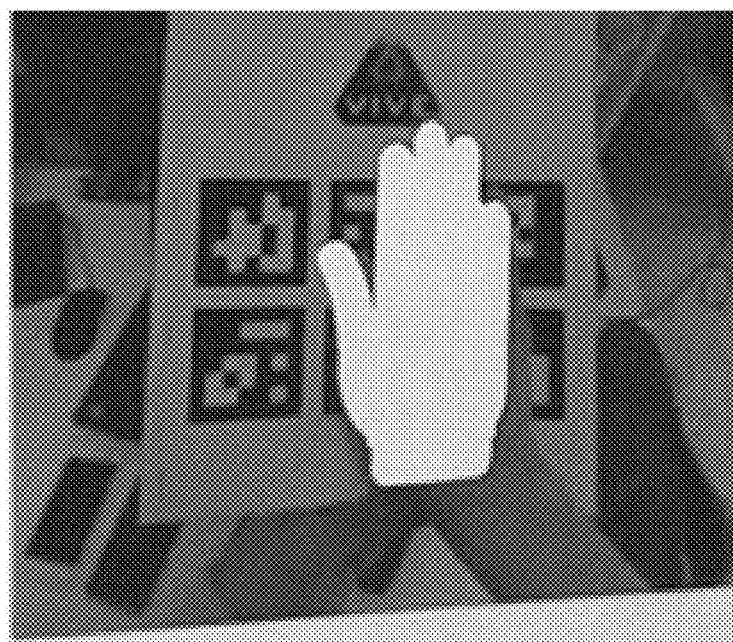

In FIG. 10, the hand positioning process is to be finished, and the hand displayed on the screen is white.

Figure 11:
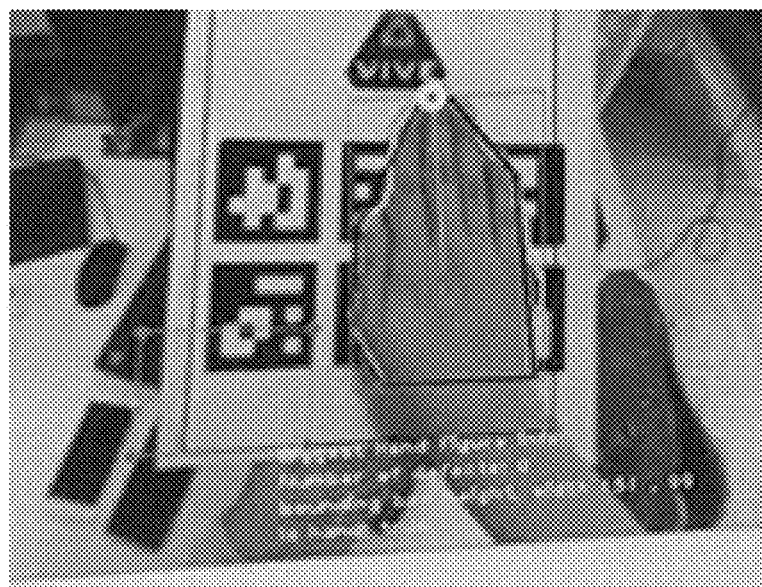
Figure 12:
FIGS. 12-15 schematically illustrate schematic diagrams of procedures of starting gesture commands according to exemplary embodiments of the present disclosure.
Figure 13:
Figure 14:
Figure 15:
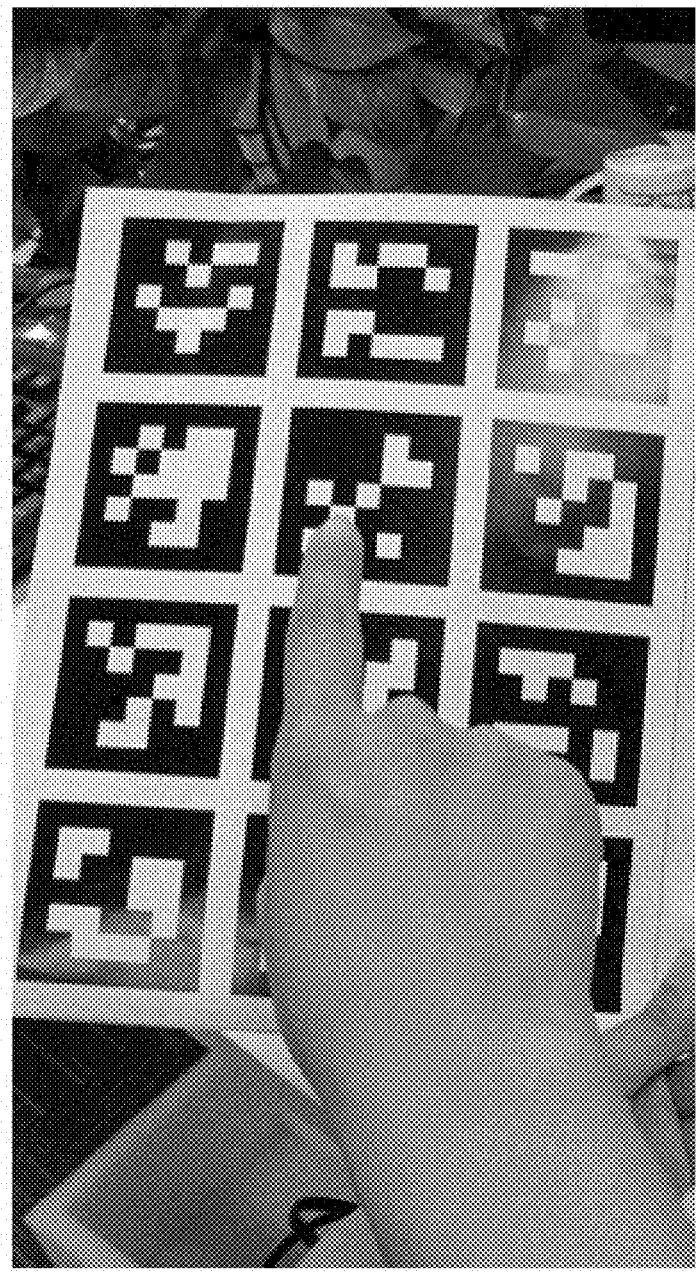

In FIG. 11, the hand positioning process is finished, the hand segmentation model based on the color is calibrated.

Furthermore, if the HMD has a RGD-D Camera, the result of hand segmentation and the three-dimensional position thereof may be directly acquired from an image with depth information.

After acquiring the result of hand segmentation, the system recognizes the gesture. The gesture recognition may be implemented via technologies such as a contour line extraction method or a graphics classifier. After recognizing the gesture, the system may trigger a relative command, for example, page flipping or opening command.

To differentiate between a gesture supported by the system and a general hand action of the user, an activation sequence may be defined. It is stipulated that the user needs to activate the gesture command according to the designed activation sequence. From the screen of the virtual helmet, the user may obtain a feedback of the activation process.

FIGS. 12-15 schematically illustrate schematic diagrams of procedures of initiating or starting an object with gesture commands according to exemplary embodiments of the present disclosure.

In the page center of the virtual booklet, the user may see an operation icon playing a role of indication, such as a thumb icon or icons of other shapes. When the virtual booklet corresponds to the physical booklet, the user may move a finger to the center of the booklet to activate an action. At this moment, the position of the finger of the user may be indicated by displaying a green dot.

As an order of activating the gesture command, the user may be first required to stay the finger at the icon position for a period of preset time. For example, a circle or an annulus gradually changing to be complete is displayed in the icon position on the screen to remind the user how soon the finger may be removed to activate or start the object. The gesture command will not be activated if the user moves the finger out of the region of the icon position in this process.

The action will be activated if the user follows the activation procedure. At this moment, the virtual environment may display an object corresponding to the position of finger, which may be, for example, a picture, a photo, video, sound, a 3D stereoscopic object, and so on.

FIGS. 16-21 schematically illustrate schematic diagrams of simulating a user's flipping over procedures according to exemplary embodiments of the present disclosure.

Figure 16:
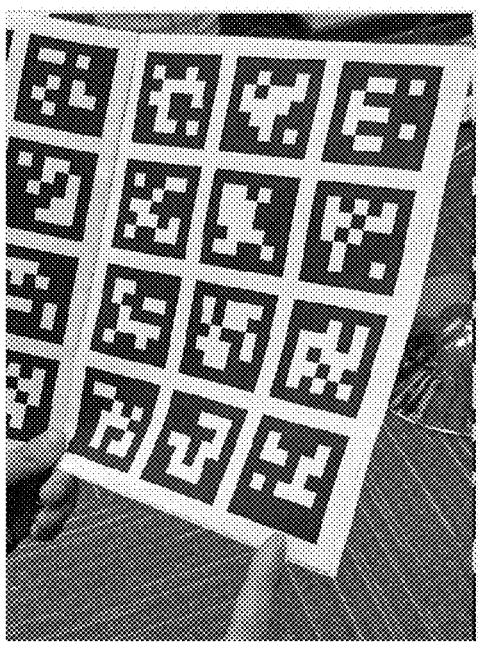
FIGS. 16-21 schematically illustrate schematic diagrams of simulating a user's flipping over procedures according to exemplary embodiments of the present disclosure.
Figure 17:
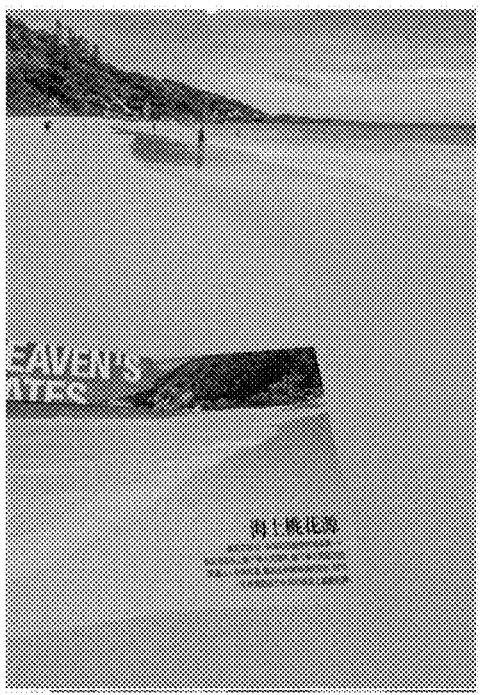

Referring to FIG. 16 and FIG. 17, when the user is in a stationary state, the finger is beyond the region of the booklet. FIG. 17 illustrates an image displayed in front of the user's eyes in the state of FIG. 16.

Figure 18:
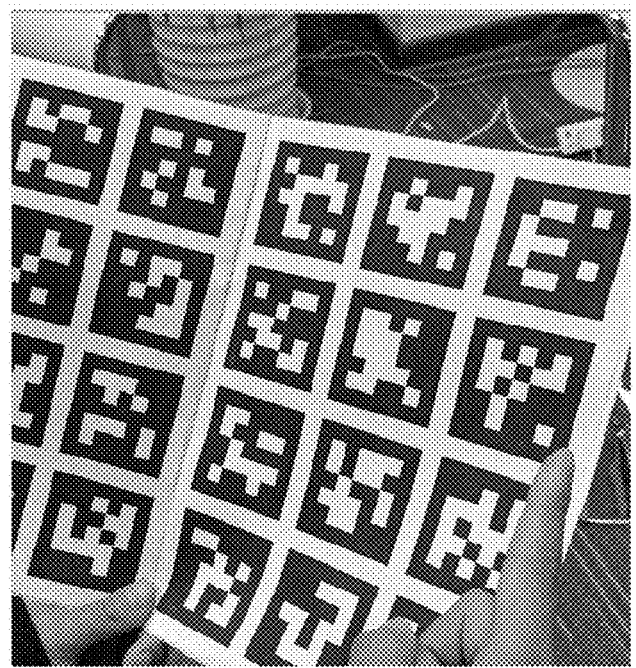
Figure 19:
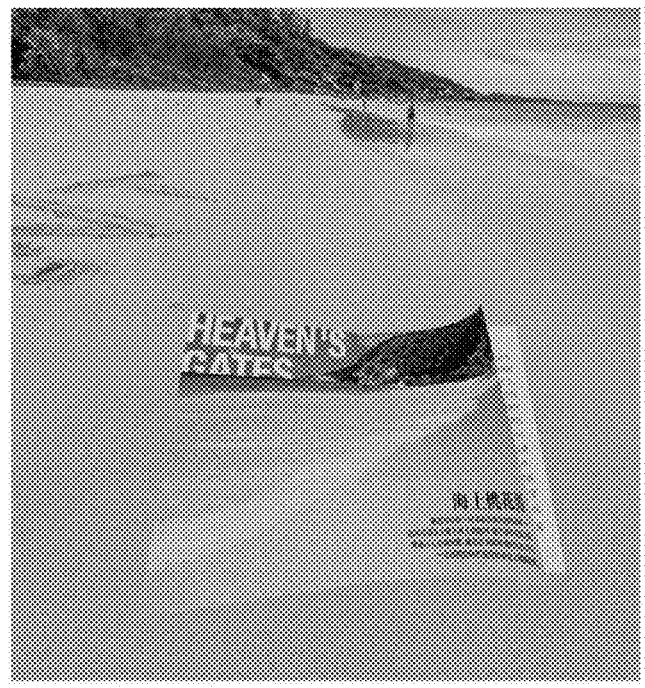

Referring to FIG. 18 and FIG. 19, when the user wants to flip to another page, the user may move the finger or the hand to the right edge of the booklet. The page edge being slightly flipped is correspondingly displayed on the screen.

Figure 20:
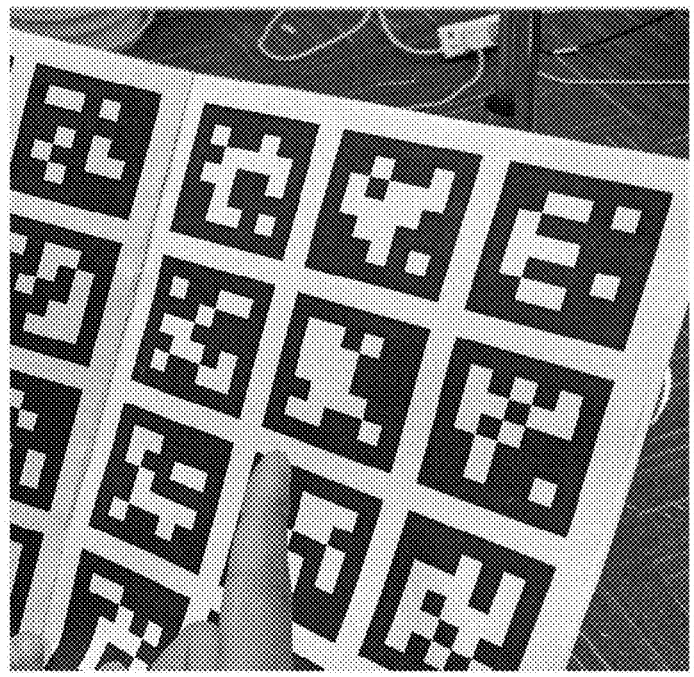
Figure 21:
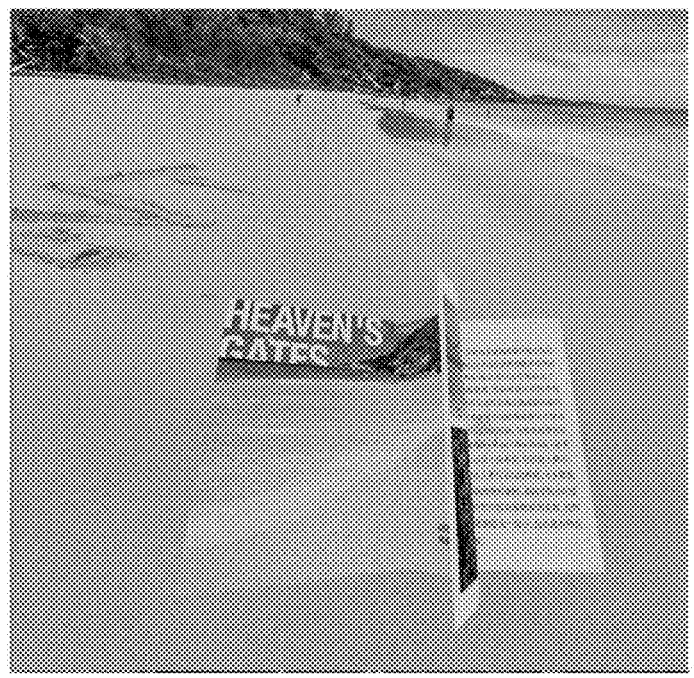
Figure 22:
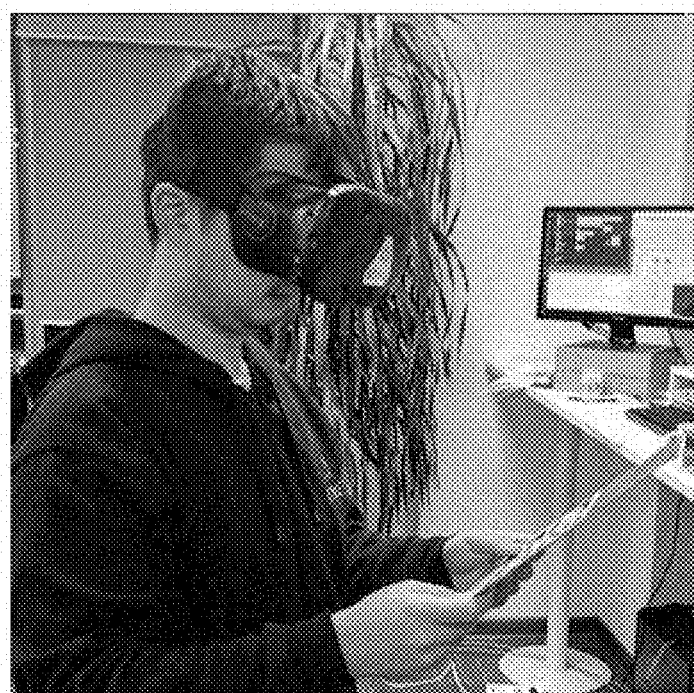
FIGS. 22-27 schematically illustrate schematic diagrams of procedures of selecting books by the user according to exemplary embodiments of the present disclosure.
Figure 23:
Figure 24:
Figure 25:
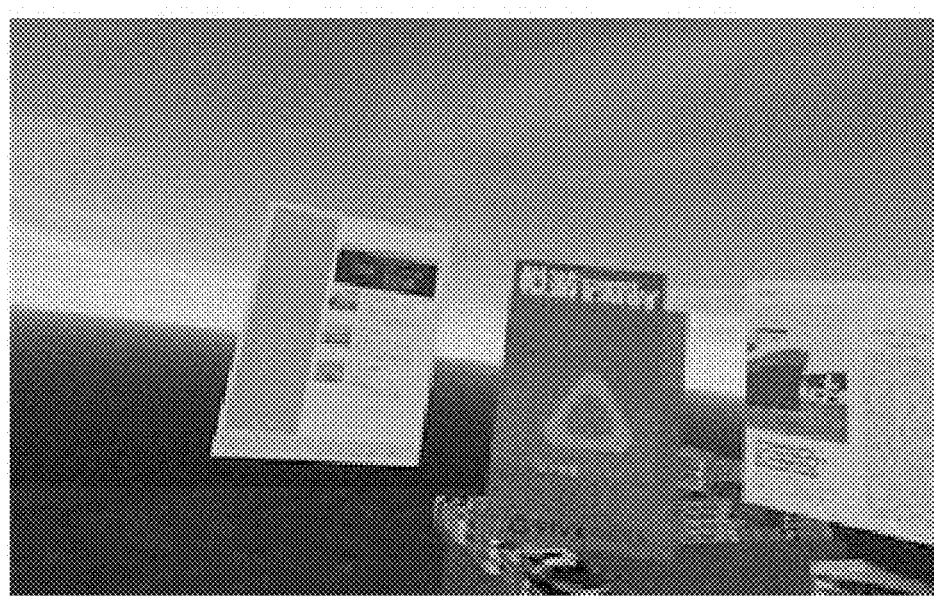
Figure 26:
Figure 27:

Referring to FIG. 20 and FIG. 21, complete activation actions executed by moving, by the user, the finger or the hand to the right in a period of predetermined time are illustrated.

As illustrated from FIG. 18 to FIG. 21, it may be determined that the finger or the hand of the user covers up the preset identifier (FIG. 18) at the right edge of the booklet in an initial state and the finger or the hand of the user covers up the preset identifier (FIG. 21) in the middle of the booklet in a final state by monitoring an image of the preset identifier on the booklet, for example, by detecting whether the image of the preset identifier is complete. It may be determined that the finger or the hand of the user moves from right to left by means of the position order of the preset identifier covered up. Therefore, a page flipping action from right to left may be performed on the virtual booklet displayed in the virtual world.

In addition to a booklet in the virtual world, the booklet mentioned above also may represent other elements or objects. Meanwhile, functions of the booklet may be further expanded by changing the posture and the operation of the booklet. These functions may not only be implemented as some additional media (for example, mini-games in magazines, or interactive experiments in textbooks) in the booklet, but also may be implemented as an independent unit of a carrier independent of the booklet. Some examples are enumerated as below:

An operation panel of the interactive experiments in the textbooks (the booklet may be displayed as an operation plane internally provided with buttons and other interactive tools);

Mini-games of advertisements in magazines: for example, advertisements of a car, the booklet may be simulated as a steering wheel (the booklet is moved right and left to simulate swinging the steering wheel right and left, and the booklet is moved back and forth to simulate acceleration or deceleration of the car).

FIGS. 22-27 schematically illustrate schematic diagrams of procedures of selecting books by the user according to the exemplary embodiments.

First, the user may enter a book selection interface by using the hand-held preset interactive object (the book) as a selection tool. The user may enter the book selection interface by means of a preset specific gesture operation or by using the buttons or the touch panel on the HMD or the preset interactive object.

The user may remove the book in the hand to a display position of the target book. This step may be implemented by calculating a 3D relative position of the user with respect to the book.

The user may convert the posture of the book in the hand to the posture of a virtual target book in the HMD environment, and confirm this selection intention by holding this action for a period of time. A markup interface uses the cover of the target book to replace the cover of the original book.

Corresponding to the above method embodiment, an exemplary embodiment of the present disclosure also provides a virtual reality interaction apparatus, which may be employed to execute the above method embodiment.

Figure 28:
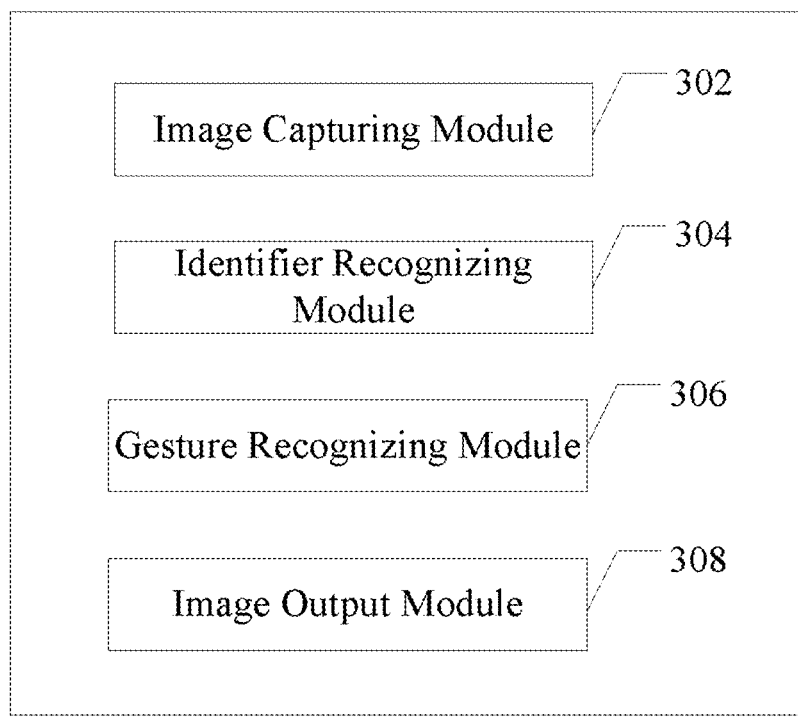
FIG. 28 schematically illustrates a block diagram of a virtual reality interaction apparatus according to an exemplary embodiment of the present disclosure.

FIG. 28 is a block diagram of a virtual reality interaction apparatus according to an exemplary embodiment of the present disclosure. Referring to FIG. 10, the virtual reality interaction apparatus 300 may include an image capturing module 302, an identifier recognizing module 304, a gesture recognizing module 306 and an image output module 308.

The image capturing module 302 may be configured to continuously acquire image information in front of a user, for example, a camera.

The identifier recognizing module 304 may be configured to recognize a preset interactive object by recognizing a preset identifier in the image information, wherein a surface of the preset interactive object has one or more of the preset identifiers.

The gesture recognizing module 306 may be configured to recognize a hand action of the user according to the image information.

The image output module 308 may be configured to simulate an interactive action of the user on the preset interactive object in a virtual reality environment according to the hand action and a position of the preset interactive object.

In an exemplary embodiment, the recognizing a preset interactive object may include recognizing the position and/or a surface state of the preset interactive object.

In an exemplary embodiment, the recognizing a hand action of the user may include recognizing a hand gesture and/or a hand position.

In an exemplary embodiment, the preset identifier may include virtual content information, and the identifier recognizing module is further configured to recognize the virtual content information.

In an exemplary embodiment, the virtual reality interaction apparatus may further include a database module, configured to record a corresponding relationship between the preset identifier and the virtual content information. The virtual content, displayed on the HMD, corresponding to the ID of the preset identifier on the booklet may be associated.

Functions of various modules of the virtual reality apparatus 300 have been described in detail in the corresponding method embodiments, and thus are not repeated any more herein.

Based on the above embodiments, the present disclosure also provides a virtual reality interaction system, which may include: a virtual reality display apparatus, configured to display a virtual reality image for a user; a preset interactive object, configured to assist in recognizing an interactive action of the user; and the virtual reality interaction apparatus according to the above embodiments.

According to the virtual reality interaction method of the present disclosure, a position of a preset interactive object is determined and a hand action of a user is determined by recognizing a preset identifier on the preset interactive object, and the preset interactive object and a relative position relationship between the hand of the user and the preset interactive object are accurately positioned. In this way, an interactive action of the user on a real object is accurately simulated in a virtual reality environment, and user experience of virtual reality is improved.

Figure 29:
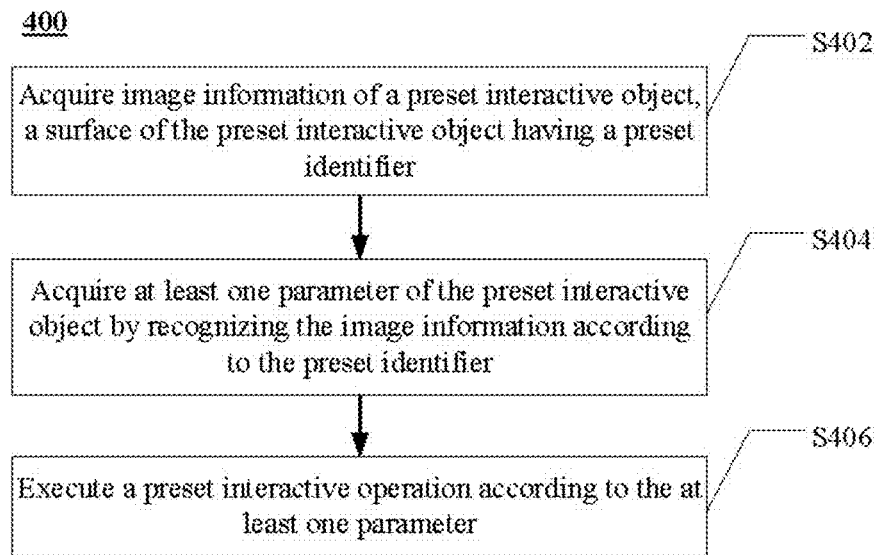
FIG. 29 schematically illustrates a flowchart of another virtual reality interaction method according to an exemplary embodiment of the present disclosure.

FIG. 29 schematically illustrates a flowchart of another virtual reality interaction method according to an exemplary embodiment of the present disclosure. As shown in FIG. 29, the virtual reality interaction method 400 may include following steps.

In Step S402, image information of a preset interactive object is acquired, wherein a surface of the preset interactive object has a preset identifier.

In an exemplary embodiment, the preset interactive object may be a booklet made from a flexible material, the booklet may include at least one page, and a surface of the at least one page has a plurality of the preset identifiers (for example, tags).

In the following embodiments, the booklet is used as a real object carrier for operating a VR book, and serves as a major interactive tool. The following embodiments of the present disclosure describe a group of interaction on the booklet.

In Step S404, at least one parameter of the preset interactive object is acquired by recognizing the image information corresponding to the preset identifier.

In an exemplary embodiment, the at least one parameter includes one or more of bending duration, a bending direction and a bending shape of the preset interactive object.

In an exemplary embodiment, the acquiring at least one parameter of the preset interactive object by recognizing the image information corresponding to the preset identifier may include: selecting a first identifier and a second identifier from a plurality of the preset identifiers on the at least one page; respectively acquiring a first normal vector of the first identifier and a second normal vector of the second identifier according to a position coordinate of the first identifier and of the second identifier; and determining an included angle between the first identifier and the second identifier according to the first normal vector and the second normal vector.

In Step S406, a preset interactive operation is executed according to the at least one parameter.

In an exemplary embodiment, the preset interactive operation includes one or more of going to next page, going to previous page, quick flip forward, and quick flip backward, etc.

It is to be noted that although in the embodiments of the present disclosure reference is made by taking an example in which the preset interactive operation is a page flipping control, the present disclosure is not limited thereto. Any one or more preset interactive operations may be predefined according to the at least one recognized parameter, for example, an operation of opening a webpage, or an operation of jumping to a next video, etc.

In an exemplary embodiment, executing a preset interactive operation according to the at least one parameter includes: determining whether a curve of the included angle varying with time falls within a predefined region; and executing an operation of going to next page when the curve of the included angle varying with time falls within the predefined region.

In an exemplary embodiment, the predefined region is defined by a predefined first curve, a predefined second curve, an intersection point between the first curve and a time axis, and an intersection point between the second curve and the time axis.

In an exemplary embodiment, executing a preset interactive operation according to the at least one parameter includes: executing an operation of quick flip forward when the included angle is greater than a first threshold and duration exceeds preset time.

In an exemplary embodiment, executing an operation of quick flip forward when the included angle is greater than a first threshold and duration exceeds preset time includes: executing the operation of quick flip forward according to a first animation page flipping speed when the included angle is greater than or equal to the first threshold and less than a second threshold; and/or executing the operation of quick flip forward according to a second animation page flipping speed when the included angle is greater than or equal to the second threshold and less than a third threshold; and/or executing the operation of quick flip forward according to a third animation page flipping speed when the included angle is greater than or equal to the third threshold and less than a fourth threshold; and/or stopping the operation of quick flip forward when the included angle is less than the first threshold.

The above embodiments of the present disclosure are illustrated below with reference to FIGS. 30-42. In the following embodiments, an exemplary description is made by taking an example in which page flipping control is implemented by bending a page of a booklet.

Figure 30:
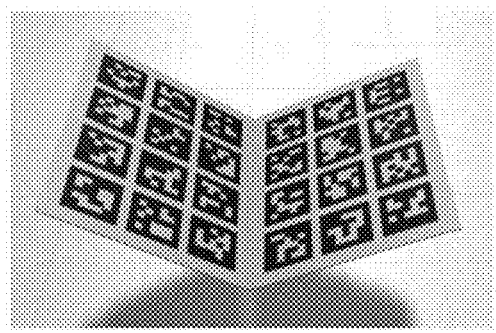
FIG. 30 schematically illustrates a schematic diagram of a general state of a booklet according to an exemplary embodiment of the present disclosure.

In the embodiments of the present disclosure, reference is made by taking an example in which the booklet includes a left page and a right page, and a plurality of tags are printed or adhered onto opposite inside surfaces of the left page and the right page. The booklet may be deformable because it is made of a flexible material. Generally, no deformation occurs in pages at two sides of the booklet, as shown in FIG. 30. Wherein the tag may be the preset identifier in the previous embodiments.

Figure 31:
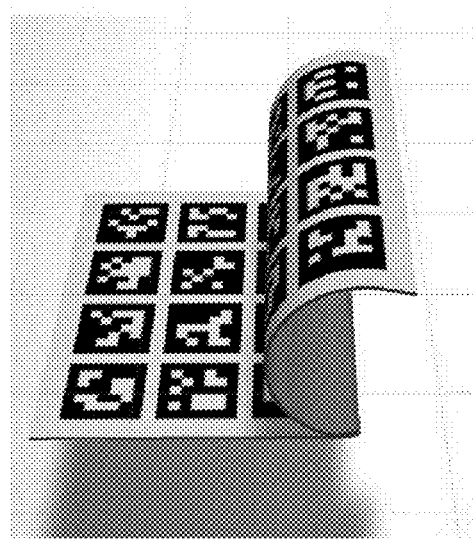
FIG. 31 schematically illustrates a schematic diagram in which a right page of a booklet is incurved according to an exemplary embodiment of the present disclosure.
Figure 32:
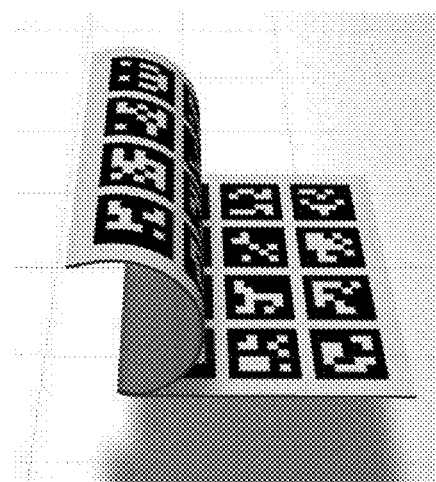
FIG. 32 schematically illustrates a schematic diagram in which a left page of a booklet is incurved according to an exemplary embodiment of the present disclosure.

In a general state of the booklet as shown in FIG. 30, a user may bend the page with hands. For example, the user incurves the right page of the booklet, as shown in FIG. 31; or the user incurves the left page of the booklet, as shown in FIG. 32.

The material of the pages at two sides of the booklet has better elasticity, and thus the page may restore the original state as shown in FIG. 30 after the hands are moved away.

When the page of the booklet is bent, wherein both the degree of bend and the angle of bend thereof may be detected using a camera or other hardware devices. The bending duration, the bending direction and the bending shape or the like may respectively or collectively define an interactive operation.

When the booklet bends or deforms, a part of the tags are shielded. Neither positions nor normal vectors of these tags can be obtained by way of direct calculation via a space geometry relationship. Positions of the tags on the booklet are predetermined, and a larger limitation is imposed on the bending deformation of the booklet, namely, the freedom of deformation is low. Therefore, positions and normal vectors of other invisible tags may be inferred through space positions and normal vectors of visible tags on the page.

Figure 33:
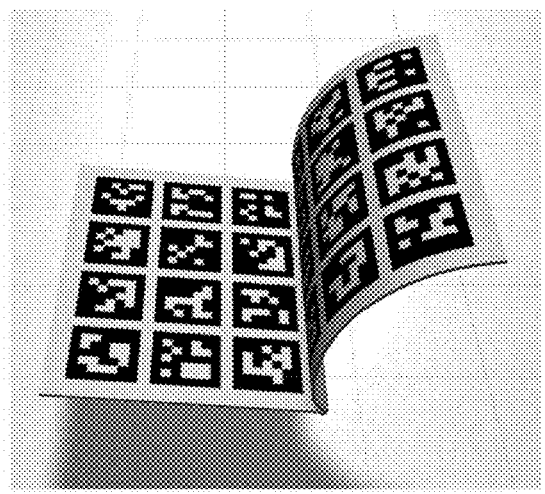
FIG. 33 schematically illustrates a schematic diagram in which a right page of another booklet is incurved according to an exemplary embodiment of the present disclosure.

FIG. 33 schematically illustrates a schematic diagram in which a right page of another booklet is incurved according to an exemplary embodiment of the present disclosure.

For example, when the bending deformation as shown in FIG. 33 occurs in the booklet, three tags on the inner side of the right page cannot be captured by the camera. However, the space positions and the normal vectors of these invisible tags on the right page may be inferred through the positions of visible tags on the left page and the positions and the normal vectors of visible tags on the right page.

Figure 34:
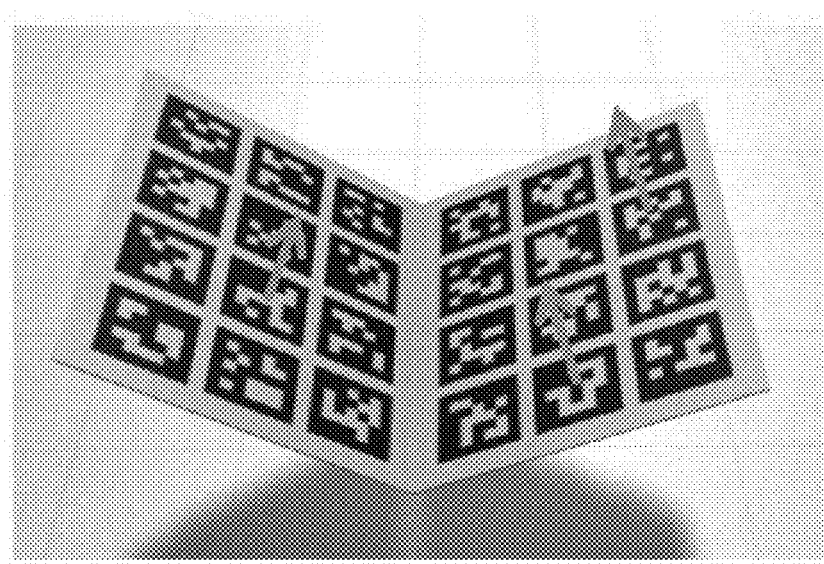
FIG. 34 schematically illustrates a schematic diagram of a normal vector of a tag of a booklet according to an exemplary embodiment of the present disclosure.

FIG. 34 schematically illustrates a schematic diagram of a normal vector of a tag of a booklet according to an exemplary embodiment of the present disclosure.

In the embodiment of the present disclosure, it is assumed that a real-time image (as shown in FIG. 34) of the booklet held in the hands of the user may be acquired using a front camera of the VR. By using the space geometry relationship, the space position $P=P_i^{camera}$ and the normal vector direction $N=N_i^{camera}$ may be calculated out for each tag in the figure relatively to the camera, wherein the space position of the camera is provided by the VR system. In this way, the position $P_i$ and the normal vector $N_i$ of an i-th tag in the world coordinate system may be calculated out.

Herein it is assumed that an outward direction of a visible surface on a tag is defined as the normal vector direction of the tag, as shown in FIG. 34.

Supposing:

1. The position, of the HMD provided by the VR system, in the world coordinate system is $P_{HMD}^{world}$, and a rotatory posture thereof in the world coordinate is $R_{HMD}^{world}$.

2. The position and the posture of the camera relative to the HMD are $P_{camera}^{world}$ and $P_{camera}^{world}$ respectively.

3. The position and the posture of the i-th tag relative to the camera respectively are $P_i^{camera}$ and $R_i^{camera}$ (there are existing algorithms in the industry for calculating the position and the posture of a tag relative to the camera, which are not unnecessarily elaborated any more herein).

Based on the above assumptions, the position and the posture of the i-th tag in the world coordinate system respectively are as below:

$$\begin{cases} P_i = R_{HMD}^{world}(R_{camera}^{HMD} P_i^{camera} + P_{camera}^{HMD}) + P_{HMD}^{world} \\ R_i = R_{HMD}^{world} R_{camera}^{HMD} R_i^{camera} \end{cases}$$

after the posture of the i-th tag is obtained, the normal vector $N_i$ of the i-th tag may be obtained as below:

$$N_i = R_i N_0$$

where the $N_0$ is the normal vector when the position and the posture of the tag respectively are $$\begin{pmatrix} 0 \\ 0 \\ 0 \end{pmatrix} \text{ and } \begin{pmatrix} 1 & 0 & 0 \\ 0 & 1 & 0 \\ 0 & 0 & 1 \end{pmatrix}.$$

Figure 35:
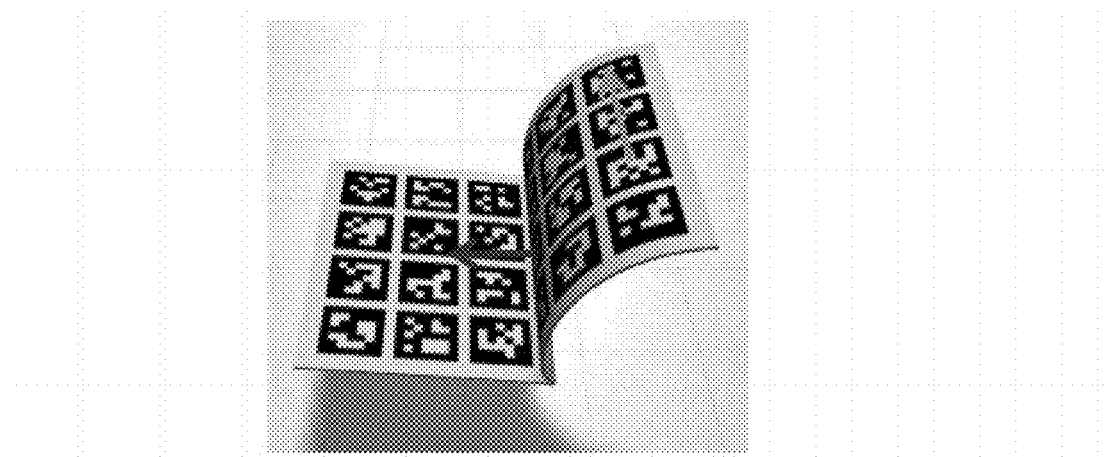
FIG. 35 schematically illustrates a schematic diagram of a first normal vector in a first identifier and a second normal vector in a second identifier according to an exemplary embodiment of the present disclosure.

FIG. 35 schematically illustrates a schematic diagram of a first normal vector in a first identifier and a second normal vector in a second identifier according to an exemplary embodiment of the present disclosure.

As shown in FIG. 35, two tags as shown in FIG. 35 are selected, whose normal vectors respectively are $\vec{N_1}$ and $\vec{N_2}$.

In the embodiment of FIG. 35, the invisible tag in the middle of the three tags in the leftmost column on the right page of the booklet is selected as the first identifier, and the visible tag in the middle of the three tags in the rightmost column on the right page of the booklet is selected as the second identifier. Advantages of the selections are as below: on the same page, when bending deformation occurs on this page, the included angle between the normal vectors of two tags in the leftmost column and the rightmost column varies most significantly, which is advantageous to recognizing a degree of variation of the included angle.

However, the present disclosure is not limited thereto. In other embodiments, any two tags on the same page on which bending deformation occurs may be selected as the first identifier and the second identifier.

Figure 36:
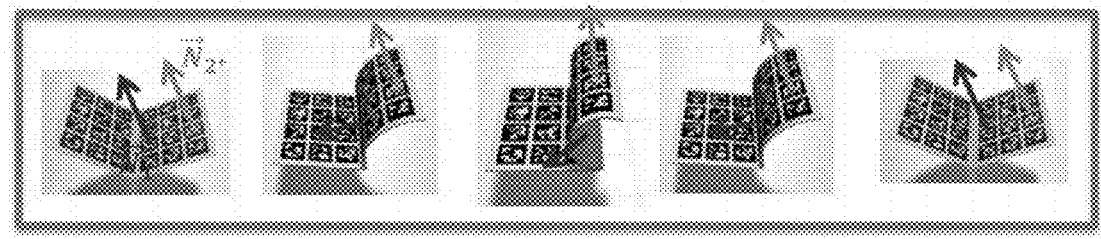
FIG. 36 schematically illustrates a schematic diagram in which a right page bends and deforms with time according to an exemplary embodiment of the present disclosure.

FIG. 36 schematically illustrates a schematic diagram in which a right page bends and deforms with time according to an exemplary embodiment of the present disclosure.

In the embodiment as shown in FIG. 36, the degree and direction of the right page bending and deforming with time may be defined by the included angle between the first normal vector and the second normal vector selected in FIG. 35.

Figure 37:
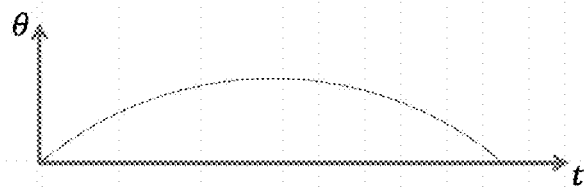
FIG. 37 schematically illustrates a schematic diagram in which an included angle between a first normal vector and a second normal vector based on FIG. 36 varies with time.

FIG. 37 schematically illustrates a schematic diagram in which an included angle between a first normal vector and a second normal vector based on FIG. 36 varies with time.

Supposing the included angle between the first normal vector $\vec{N_1}$ and the second normal vector $\vec{N_2}$ is denoted as $\theta$. A function of $\theta$ varying with time is denoted as $\theta=\theta(t)$. For example, when the page varies with time just as shown in FIG. 36, the pattern of $\theta=\theta(t)$ is as shown in FIG. 37.

In some embodiments, an operation of going to next page implemented by incurving the right page just as shown in FIG. 36 may be predefined. However, the present disclosure is not limited thereto.

Figure 38:
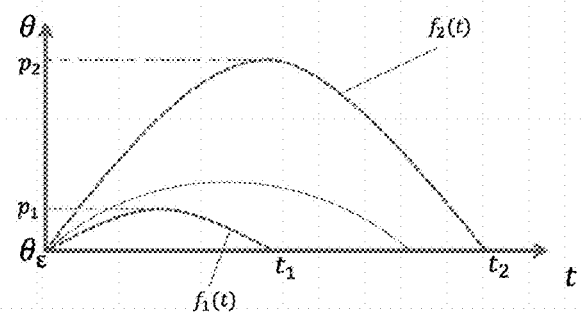
FIG. 38 schematically illustrates a schematic diagram in which the included angle curve as shown in FIG. 37 falls within a predefined region according to an embodiment of the present disclosure.

FIG. 38 schematically illustrates a schematic diagram in which the included angle curve as shown in FIG. 37 falls within a predefined region according to an embodiment of the present disclosure.

In the embodiment of FIG. 38, an operation of going to next page may be defined when the curve of $\theta=\theta(t)$ as shown in FIG. 37 falls within the predefined region encircled by $f_1(t)$, $f_2(t)$ and a line segment $t_1 t_2$.

The value range of $\theta_\varepsilon$ is [0, 180] degrees. In the embodiment of the present disclosure, supposing $\theta_\varepsilon=10$. $\theta_\varepsilon$ denotes it is started to detect whether a subsequent operation satisfies a page flipping action when the page bending angle $\theta$ is equal to $\theta_\varepsilon$. No determination is made when $\theta<\theta_\varepsilon$. This is to prevent misoperation from being caused by slight variation of angle of the page resulted from some slight actions.

The $t_1$ defines the shortest time duration of page bending as a page flipping operation, whose value range is [0, 60] s. In the embodiment of the present disclosure, $t_1=0.1$ s.

The $t_2$ defines the longest time duration of page bending as a page flipping operation, whose value range is [$t_1$, 60] s. In the embodiment of the present disclosure, $t_2=1$ s.

In the embodiment of the present disclosure, $f_1(t)$ may be as shown in the following Formula:

$$f_1(t) = -(p_1 - \theta_\varepsilon)\left(\frac{2}{t_1}\right)^2 \left(t - \frac{t_1}{2}\right)^2 + p_1,$$

where the value range of the $p_1$ is [$\theta_\varepsilon$, 180] degrees. In the embodiment of the present disclosure, $p_1=15$ degrees.

In the embodiment of the present disclosure, $f_2(t)$ may be as shown in the following Formula:

$$f_2(t) = -(p_2 - \theta_\varepsilon)\left(\frac{2}{t_2}\right)^2 \left(t - \frac{t_2}{2}\right)^2 + p_2,$$

where the value range of the $p_2$ is [$p_1$, 180] degrees. In the embodiment of the present disclosure, $p_2=45$ degrees.

Figure 39:
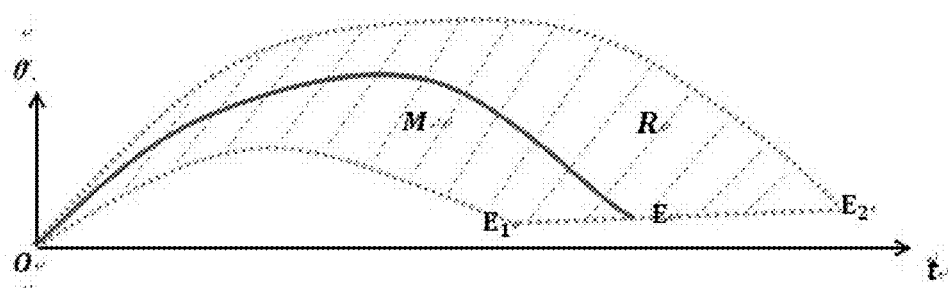
FIG. 39 schematically illustrates another schematic diagram in which an included angle curve falls within a predefined region according to an embodiment of the present disclosure.

FIG. 39 schematically illustrates another schematic diagram in which an included angle curve falls within a predefined region according to an embodiment of the present disclosure.

As shown in FIG. 39, the $\theta$ is still the included angle between the first normal vector $\vec{N_1}$ and the second normal vector $\vec{N_2}$. Region R ($OE_1E_2O$) is a predefined region. An operation of going to next page may be triggered when the page bending included angle curve in the page flipping process is within the Region R and intersects with a straight line $\overline{E_1E_2}$. For example, a curve $\overline{OVE}$.

In some embodiments, it also may be predefined to trigger an operation of going to previous page when incurving the left page of the booklet satisfies a certain condition. The above operation of going to next page may be referred to for the implementation process of this operation, which is not unnecessarily elaborated any more herein.

Figure 40:
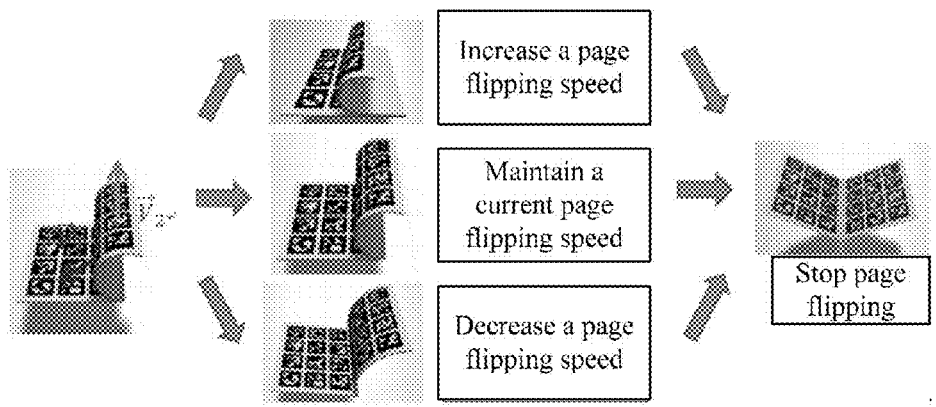
FIG. 40 schematically illustrates a schematic diagram of executing an operation of quick flip forward according to an embodiment of the present disclosure.

FIG. 40 schematically illustrates a schematic diagram of executing an operation of quick flip forward according to an embodiment of the present disclosure.

As shown in FIG. 40, it may be predefined to trigger an operation of quick flip forward when incurving the right page of the booklet satisfies a certain condition. In addition, it also may be predefined to increase/maintain/decrease a page flipping speed or stop page flipping when the angle of incurving the right page satisfies a certain condition.

In the embodiment of the present disclosure, it is assumed to start continuing animation page flipping when $\theta>\theta_1$ and the duration exceeds $t_b$ s, where the value range of the $t_b$ may be [0.01, 100] s. In the embodiment of the present disclosure, $t_b=1$ s.

When $\theta_1<\theta<\theta_2$, it is assumed that the animation page flipping speed is $S_1$ page/s. The value range of the $\theta_1$ may be [$\theta_0$, 180] degrees, the value range of $\theta_0$ may be [0, 180] degrees; and the value range of the $\theta_2$ may be [$\theta_1$, 180] degrees.

When $\theta_2<\theta<\theta_3$, it is assumed that the animation page flipping speed is $S_2$ page/s. The value range of the $\theta_3$ may be [$\theta_2$, 180] degrees.

In the embodiment of the present disclosure, $\theta_0=10$ degrees, $\theta_1=30$ degrees, $\theta_2=60$ degrees, and $\theta_3=90$ degrees. However, the present disclosure is not limited thereto.

When $\theta>\theta_3$, it is assumed that the animation page flipping speed is $S_3$ page/s.

When $\theta_1 \leq \theta_1$, it is assumed to stop the operation of quick flip forward.

The value range of $S_1$ may be [1, 100]. The value range of $S_2$ may be [$S_1$, 100]. The value range of $S_3$ may be [$S_2$, 100].

In the embodiment of the present disclosure, $S_1=1$, $S_2=3$, and $S_3=5$.

It is to be noted that the values and the value ranges of the above angles, page flipping speeds and page flipping time may be flexibly adjusted and selected according to requirements for specific application scenarios, and not limited to the enumerated values. In addition, triggering or stopping the operation of quick flip forward and increasing, maintaining or decreasing a page flipping speed may be set up according to the specific needs.

Figure 41:
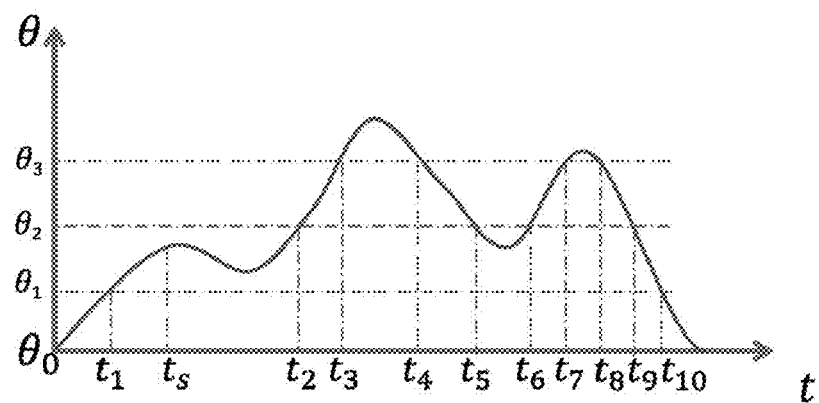
FIG. 41 schematically illustrates a schematic diagram of an included angle curve when executing the operation of quick flip forward according to an embodiment of the present disclosure.

FIG. 41 schematically illustrates a schematic diagram of an included angle curve when executing the operation of quick flip forward according to an embodiment of the present disclosure.

Based on what is shown in FIG. 40, it is assumed that the included angle $\theta=\theta(t)$ between the normal vectors of two selected tags is as shown in FIG. 41.

when it is at the moment of $t_1$, $\theta > \theta_1$, and after the duration $t_b = 1$ s, the quick flip animation is start at the moment of $t_s = t_1 + t_b$.

When it is from $t_s$ to $t_2$, $\theta_1 < \theta < \theta_2$, and the animation page flipping speed is 1 page/s.

When it is from $t_2$ to $t_3$, $\theta_2 < \theta < \theta_3$, and the animation page flipping speed is 3 page/s.

When it is from $t_3$ to $t_4$, $\theta > \theta_3$, and the animation page flipping speed is 5 page/s.

When it is from $t_4$ to $t_5$, $\theta_2 < \theta < \theta_3$, and the animation page flipping speed is 3 page/s.

When it is from $t_5$ to $t_6$, $\theta_1 < \theta < \theta_2$, and the animation page flipping speed is 1 page/s.

When it is from $t_6$ to $t_7$, $\theta_2 < \theta < \theta_3$, and the animation page flipping speed is 3 page/s.

When it is from $t_7$ to $t_8$, $\theta > \theta_3$, and the animation page flipping speed is 5 page/s.

When it is from $t_8$ to $t_9$, $\theta_2 < \theta < \theta_3$, and the animation page flipping speed is 3 page/s.

When it is from $t_9$ to $t_{10}$, $\theta_1 < \theta < \theta_2$, and the animation page flipping speed is 1 page/s.

When $t > t_{10}$, $\theta < \theta_1$, and the animation page flipping is stopped.

Figure 42:
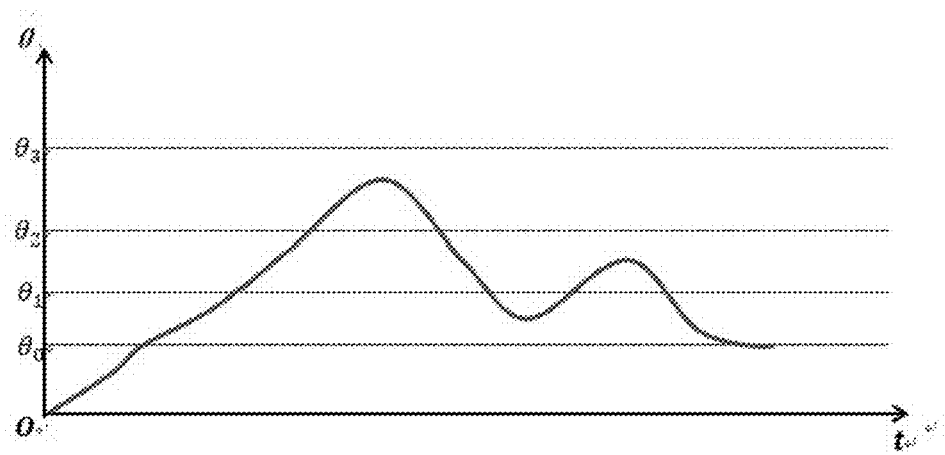
FIG. 42 schematically illustrates a schematic diagram of another included angle curve when executing the operation of quick flip forward according to an embodiment of the present disclosure.

FIG. 42 schematically illustrates a schematic diagram of another included angle curve when executing the operation of quick flip forward according to an embodiment of the present disclosure;

As shown in FIG. 42, when $\theta_0 < \theta < \theta_1$, the animation page flipping speed may be 1 page/s.

When $\theta_1 < \theta < \theta_2$, the animation page flipping speed may be 3 page/s.

When $\theta_2 < \theta < \theta_3$ the animation page flipping speed may be 5 page/s.

When $\theta \leq \theta_0$, the animation page flipping may be stopped.

In some other embodiments, it also may be defined to trigger an operation of quick flip backward when bending the left page of the booklet satisfies a preset condition. The above operation of quick flip forward may be referred to for the specific implementation of this operation, which is not unnecessarily elaborated any more herein.

Figure 43:
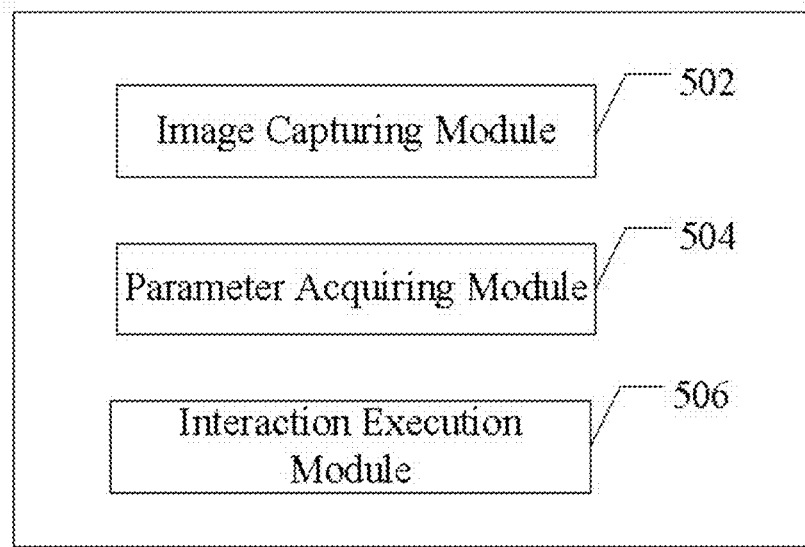
FIG. 43 schematically illustrates a block diagram of another virtual reality interaction apparatus according to an exemplary embodiment of the present disclosure.

FIG. 43 schematically illustrates a block diagram of another virtual reality interaction apparatus according to an exemplary embodiment of the present disclosure; and As shown in FIG. 43, the virtual reality interaction apparatus 500 may include an image capturing module 502, a parameter acquiring module 504, and an interaction execution module 506.

The image capturing module 502 may be configured to acquire image information of a preset interactive object, a surface of the preset interactive object having a preset identifier.

The parameter acquiring module 504 may be configured to acquire at least one parameter of the preset interactive object by recognizing the image information corresponding to the preset identifier.

The interaction execution module 506 may be configured to execute a preset interactive operation according to the at least one parameter.

Functions of various modules of the virtual reality apparatus 500 have been described in detail in the corresponding method embodiments, and thus are not repeated any more herein.

It is to be noticed that although a plurality of modules or units of the device for action execution have been mentioned in the above detailed description, this partition is not compulsory. Actually, according to the embodiment of the present disclosure, features and functions of two or more modules or units as described above may be embodied in one module or unit. Reversely, features and functions of one module or unit as described above may be further embodied in more modules or units.

In addition, steps of the method in the present disclosure are described in a particular order in the accompanying drawings. However, this does not require or imply to execute these steps necessarily according to the particular order, or this does not mean that the expected result cannot be implemented unless all the shown steps are executed. Additionally or alternatively, some steps may be omitted, a plurality of steps may be combined into one step for execution, and/or one step may be decomposed into a plurality of steps for execution.

Figure 44:
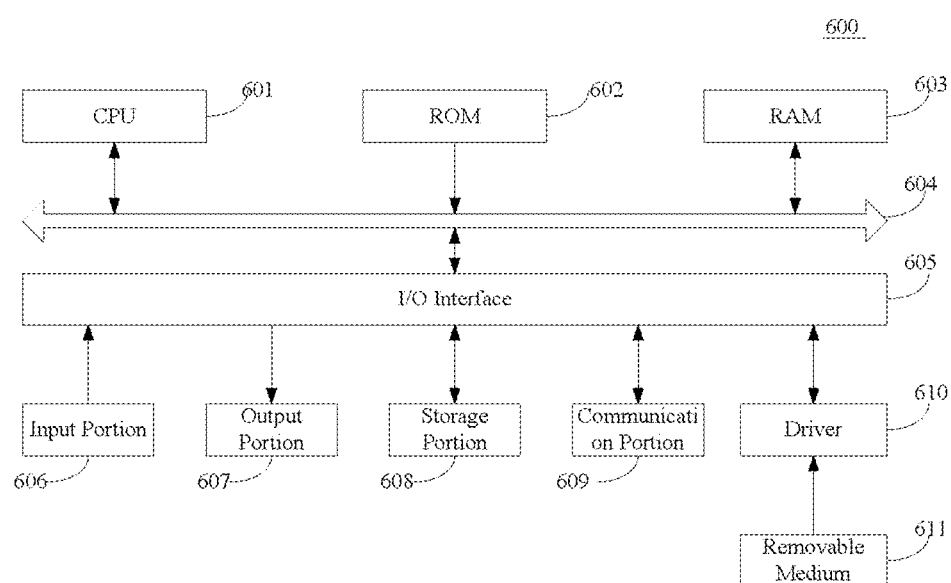
FIG. 44 schematically illustrates a schematic structural diagram of an electronic device according to an exemplary embodiment of the present disclosure.

FIG. 44 schematically illustrates a schematic structural diagram of an electronic device according to an exemplary embodiment of the present disclosure.

Referring to FIG. 44, a schematic structural diagram of a computer system 600 adapted to implement the embodiment of the present disclosure is shown. The electronic device as shown in FIG. 44 is merely an example, and no limitation should be imposed on functions or scope of use of the embodiment of the present disclosure.

As shown in FIG. 44, the electronic device 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a computer-readable medium. The computer program comprises program codes for executing the method as illustrated in the flowchart. In such an embodiment, the computer program may be downloaded and installed from a network via the communication portion 609, and/or may be installed from the removable media 611. The computer program, when executed by the CPU 601, implements the functions as defined by the system of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams or the flowcharts and/or a combination of the blocks in the block diagrams or the flowcharts may be implemented by a dedicated hardware-based system executing specified functions or operations, or by a combination of a dedicated hardware and computer instructions.

The units or modules involved in the embodiments of the present disclosure may be implemented by way of software or hardware. The described units also may be provided in a processor, for example, described as: a processor, comprising a sending unit, an acquiring unit, a determining unit, and a first processing unit. Names of these units are not considered as a limitation to the units in some cases. For example, the sending unit also may be described as "a unit for sending a picture acquiring request to a connected server".

In another aspect, the present disclosure further provides a computer-readable medium. The computer-readable medium may be the medium included in the device as described in the above embodiment, or a stand-alone medium which has not been assembled into the device. The computer-readable medium hosts one or more programs. When the one or more programs are executed by the device, the device is caused to: continuously acquire image information in front of a user; recognize a preset interactive object by recognizing a preset identifier in the image information, a surface of the preset interactive object having one or more of the preset identifiers; recognize a hand action of the user according to the image information; and simulate an interactive action of the user on the preset interactive object in a virtual reality environment according to the hand action and a position of the preset interactive object.

In another aspect, the present disclosure further provides another computer-readable medium. The computer-readable medium may be the medium included in the device as described in the above embodiments, or a stand-alone medium which has not been assembled into the device. The computer-readable medium hosts one or more programs. When the one or more programs are executed by the device, the device is caused to: acquire image information of a preset interactive object, a surface of the preset interactive object having a preset identifier; acquire at least one parameter of the preset interactive object by recognizing the image information corresponding to the preset identifier; and execute a preset interactive operation according to the at least one parameter.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A virtual reality interaction method, comprising:
   continuously acquiring image information in front of a user;
   recognizing a preset interactive object by recognizing a preset identifier in the image information, wherein a surface of the preset interactive object has one or more of the preset identifiers;
   recognizing a hand action of the user according to the image information;
   simulating an interactive action of the user on the preset interactive object in a virtual reality environment according to the hand action and a position of the preset interactive object,
   acquiring at least one parameter of the preset interactive object by recognizing the image information corresponding to the preset identifier; and
   executing a preset interactive operation according to the at least one parameter,
   wherein the preset interactive object is a booklet made from a flexible material, the booklet comprises at least one page, and a surface of the at least one page has a plurality of the preset identifiers.

2. The method according to claim 1, wherein the step of recognizing a preset interactive object comprises recognizing at least one of the position and a surface state of the preset interactive object.

3. The method according to claim 1, wherein the step of recognizing a hand action of the user comprises recognizing at least one of a hand gesture and a hand position.

4. The method according to claim 1, wherein the preset identifier comprises virtual content information, and recognizing a preset identifier in the image information further comprises recognizing the virtual content information.

5. The method according to claim 1, wherein the acquiring at least one parameter of the preset interactive object by recognizing the image information corresponding to the preset identifier comprises:
   selecting a first identifier and a second identifier from a plurality of the preset identifiers on the at least one page;
   respectively acquiring a first normal vector of the first identifier and a second normal vector of the second identifier according to a position coordinate of the first identifier and of the second identifier; and
   determining an included angle between the first identifier and the second identifier according to the first normal vector and the second normal vector.

6. The method according to claim 5, wherein executing a preset interactive operation according to the at least one parameter comprises:
   determining whether a curve of the included angle varying with time falls within a predefined region; and
   executing an operation of going to next page when the curve of the included angle varying with time falls within the predefined region.

7. The method according to claim 6, wherein the predefined region is defined by a predefined first curve, a predefined second curve, an intersection point between the first curve and a time axis, and an intersection point between the second curve and the time axis.

8. The method according to claim 5, wherein executing a preset interactive operation according to the at least one parameter comprises: executing an operation of quick flip forward in response to the included angle is greater than a first threshold and duration exceeds preset time.

9. The method according to claim 5, wherein executing an operation of quick flip forward in response to the included angle is greater than a first threshold and duration exceeds preset time comprises:
executing the operation of quick flip forward according to a first animation page flipping speed in response to the included angle is greater than or equal to the first threshold and less than a second threshold; and/or
executing the operation of quick flip forward according to a second animation page flipping speed in response to the included angle is greater than or equal to the second threshold and less than a third threshold; and/or
executing the operation of quick flip forward according to a third animation page flipping speed in response to the included angle is greater than or equal to the third threshold and less than a fourth threshold; and/or
stopping the operation of quick flip forward in response to the included angle is less than the first threshold.

10. A non-transitory computer-readable medium containing instructions for performing the method of claim 1.

11. An electronic device, comprising:
one or more processors; and
a storage apparatus, configured to store one or more programs;
when the one or more programs are executed by the one or more processors, the one or more processors are caused to implement:
continuously acquiring image information in front of a user;
recognizing a preset interactive object by recognizing a preset identifier in the image information, wherein a surface of the preset interactive object having one or more of the preset identifiers;
recognizing a hand action of the user according to the image information;
simulating an interactive action of the user on the preset interactive object in a virtual reality environment according to the hand action and a position of the preset interactive object;
acquiring at least one parameter of the preset interactive object by recognizing the image information corresponding to the preset identifier; and
executing a preset interactive operation according to the at least one parameter,
wherein the preset interactive object is a booklet made from a flexible material, the booklet comprises at least one page, and a surface of the at least one page has a plurality of the preset identifiers.

12. The electronic device according to claim 11, wherein the processors caused to implement acquiring at least one parameter of the preset interactive object by recognizing the image information corresponding to the preset identifier are configured to implement:
selecting a first identifier and a second identifier from a plurality of the preset identifiers on the at least one page;
respectively acquiring a first normal vector of the first identifier and a second normal vector of the second identifier according to a position coordinate of the first identifier and of the second identifier; and
determining an included angle between the first identifier and the second identifier according to the first normal vector and the second normal vector.

13. The electronic device according to claim 12, wherein the processors caused to implement executing a preset interactive operation according to the at least one parameter are configured to implement:
determining whether a curve of the included angle varying with time falls within a predefined region; and
executing an operation of going to next page when the curve of the included angle varying with time falls within the predefined region.

14. The electronic device according to claim 11, wherein the processors caused to implement executing a preset interactive operation according to the at least one parameter are configured to implement: executing an operation of quick flip forward when the included angle is greater than a first threshold and duration exceeds preset time.

15. A virtual reality interaction method, comprising:
continuously acquiring image information in front of a user;
recognizing a preset interactive object by recognizing a preset identifier in the image information, wherein a surface of the preset interactive object has one or more of the preset identifiers;
recognizing a hand action of the user according to the image information; and
simulating an interactive action of the user on the preset interactive object in a virtual reality environment according to the hand action and a position of the preset interactive object,
wherein the at least one parameter comprises one or more of bending duration, a bending direction and a bending shape of the preset interactive object.

16. A non-transitory computer-readable medium containing instructions for performing the method of claim 15.

17. An electronic device, comprising:
one or more processors; and
a storage apparatus, configured to store one or more programs;
when the one or more programs are executed by the one or more processors, the one or more processors are caused to implement:
continuously acquiring image information in front of a user;
recognizing a preset interactive object by recognizing a preset identifier in the image information, wherein a surface of the preset interactive object having one or more of the preset identifiers;
recognizing a hand action of the user according to the image information; and
simulating an interactive action of the user on the preset interactive object in a virtual reality environment according to the hand action and a position of the preset interactive object,
wherein the at least one parameter comprises one or more of bending duration, a bending direction and a bending shape of the preset interactive object.

18. A virtual reality interaction method, comprising:
continuously acquiring image information in front of a user;
recognizing a preset interactive object by recognizing a preset identifier in the image information, wherein a surface of the preset interactive object has one or more of the preset identifiers;
recognizing a hand action of the user according to the image information; and simulating an interactive action of the user on the preset interactive object in a virtual reality environment according to the hand action and a position of the preset interactive object, wherein the preset interactive operation comprises one or more of going to next page, going to previous page, quick flip forward, and quick flip backward.

19. A non-transitory computer-readable medium containing instructions for performing the method of claim 18.

20. An electronic device, comprising:

one or more processors; and a storage apparatus, configured to store one or more programs;

when the one or more programs are executed by the one or more processors, the one or more processors are caused to implement:

continuously acquiring image information in front of a user;

recognizing a preset interactive object by recognizing a preset identifier in the image information, wherein a surface of the preset interactive object having one or more of the preset identifiers;

recognizing a hand action of the user according to the image information; and simulating an interactive action of the user on the preset interactive object in a virtual reality environment according to the hand action and a position of the preset interactive object, wherein the preset interactive operation comprises one or more of going to next page, going to previous page, quick flip forward, and quick flip backward.

\* \* \* \* \*